(12) United States Patent
Drath et al.

(10) Patent No.: US 8,290,990 B2
(45) Date of Patent: Oct. 16, 2012

(54) SYSTEM AND METHOD FOR MANAGING AND EXCHANGING DATA OF A TECHNICAL PROJECT, TECHNICAL INSTALLATION AND INDIVIDUAL INSTALLATION COMPONENTS

(75) Inventors: Peter Drath, Dossenheim (DE); Peter Bort, Tamm (DE); Alexander Fay, Hamburg (DE)

(73) Assignee: ABB Research Ltd, Zürich (CH)

( * ) Notice: Subject to any disclaimer, the term of this patent is extended or adjusted under 35 U.S.C. 154(b) by 147 days.

(21) Appl. No.: 10/546,732

(22) PCT Filed: Feb. 26, 2004

(86) PCT No.: PCT/EP2004/001884
§ 371 (c)(1),
(2), (4) Date: Jun. 16, 2006

(87) PCT Pub. No.: WO2004/077305
PCT Pub. Date: Sep. 10, 2004

(65) Prior Publication Data
US 2007/0005805 A1    Jan. 4, 2007

(30) Foreign Application Priority Data

Feb. 28, 2003  (DE) .................................. 103 08 725

(51) Int. Cl.
*G06F 7/00* (2006.01)
*G06F 17/30* (2006.01)
(52) U.S. Cl. ...................................................... 707/809
(58) Field of Classification Search ............... 707/104.1; 709/246
See application file for complete search history.

(56) References Cited

U.S. PATENT DOCUMENTS

| | | | | |
|---|---|---|---|---|
| 5,404,488 A | * | 4/1995 | Kerrigan et al. | 711/133 |
| 5,708,828 A | * | 1/1998 | Coleman | 715/205 |
| 6,295,541 B1 | * | 9/2001 | Bodnar et al. | 1/1 |
| 6,785,673 B1 | * | 8/2004 | Fernandez et al. | 707/3 |

(Continued)

FOREIGN PATENT DOCUMENTS

DE    101 38 533 A1    7/2002

(Continued)

OTHER PUBLICATIONS

W3C Extensible Markup Language (XML) 1.0 (Second Edition), W3C Recommendation Oct. 6, 2000, Applicant Admitted Prior Art.*

(Continued)

*Primary Examiner* — Jason Liao
(74) *Attorney, Agent, or Firm* — Buchanan Ingersoll & Rooney PC (57) ABSTRACT

Systems and methods are disclosed for managing and exchanging data relating to an automation project. The automation project has a data-processing system with a conversion device that converts data from at least one proprietary data format into a standardized data format, and vice versa. The conversion device uses at least one data assignment to assign at least one first piece of information, given in the standardized data format, to a second piece of information, given in the proprietary format, and/or vice versa. In addition, the conversion device is configured to locate at least one first piece of information, given in the proprietary data format, the corresponding data assignment assigned to it from among the data assignments that are present, and based on the located data assignment, transform the proprietary first piece of information into a standardized second piece of information specified in the data assignment, or vice versa.

27 Claims, 6 Drawing Sheets

U.S. PATENT DOCUMENTS

| | | | |
|---|---|---|---|
| 6,931,590 B2* | 8/2005 | Kanie et al. | 715/234 |
| 7,031,956 B1* | 4/2006 | Lee et al. | 707/3 |
| 7,107,523 B2* | 9/2006 | Bussert et al. | 715/239 |
| 2001/0044811 A1* | 11/2001 | Ballantyne et al. | 707/513 |
| 2002/0059566 A1 | 5/2002 | Delcambre et al. | |
| 2002/0100027 A1 | 7/2002 | Binding et al. | |
| 2002/0120630 A1 | 8/2002 | Christianson et al. | |
| 2002/0161749 A1 | 10/2002 | Pratt | |
| 2002/0184308 A1 | 12/2002 | Levy et al. | |

FOREIGN PATENT DOCUMENTS

| | | |
|---|---|---|
| EP | 1 117 049 A1 | 7/2001 |
| EP | 1117049 A1 * | 7/2001 |
| WO | 96/37817 | 11/1996 |

OTHER PUBLICATIONS

Howe, The Free Online Dictionary of Computing, 2002, The Imperial College Department of Computing, http://foldoc.org/algorithm.*

The Authoritative IEEE Dictionary of Standards and Terms, 2000, IEEE, 7th ed, p. 25.*

Knuth, The Art of Computer Programming, 1998, Addison-Wesley, vol. 1.(Chapter)1.1, 3.Table of Contents.*

Lane et al, Oracle Database Data Warehousing Guide, 10g Release 1. 2003, Oracle Corporation, 10.1, all.*

Wang et al, Temporal Queries in XML Document Archives and Web Warehouses, 2003, IEEE, Proceedings of the 10$^{th}$ International Symposium on Temporal Representation and Reasoning and the Fourth International Conference on Temporal Logic, pages unknown.*

"Extensible Markup Language (XML) 1.0 (Second Edition)", W3C Recommendation, pp. 1-39, Oct. 6, 2000, XP-002188896 (cited in the International Search Report attached herewith).

"Product Data Management: The Definition, An Introduction to Concepts, Benefits, and Terminology", Cimdata, pp. 1-27, Sep. 2, 1997, XP-002226495 (cited in the International Search Report attached herewith).

International Preliminary Report on Patentability (Form PCT/IB/373) and English language translation of Written Opinion (Form PCT/ISA/237), issued in corresponding PCT/EP2004/001884, The International Bureau of WIPO, Geneva, CH.

Search Report issued by the German Patent Office in priority German Patent Application No. 103 08 725.7.

* cited by examiner

SYSTEM AND METHOD FOR MANAGING AND EXCHANGING DATA OF A TECHNICAL PROJECT, TECHNICAL INSTALLATION AND INDIVIDUAL INSTALLATION COMPONENTS

RELATED APPLICATIONS

This application claims priority under 35 U.S.C. §119 to German Application No. 103 08 725.7, filed Feb. 28, 2003. This application also claims priority under 35 U.S.C. §371 to PCT Application No. PCT/EP2004/001884, filed as an International Application on Feb. 26, 2004, designating the U.S. The entire contents of each of these applications are hereby incorporated by reference in their entireties.

The present invention relates to a system and a method for managing and exchanging data relating to a technical project and/or a technical installation and/or individual installation components and also in particular an automation project for a technical installation, an efficient and consistent interaction between a number of different applications or data processing tools being achieved and ensured by the present invention.

A project in the sense of the invention claimed here may comprise, for example, the planning, development, construction, testing, acceptance testing, commissioning, operation or else servicing and maintenance and, if appropriate, expansion and modification of a technical installation and/or individual installation components, that is to say a technical installation and/or individual installation components in all their life cycle phases.

The project data of an automation project for a technical installation comprise here in particular the entire life cycle of the aforementioned installation from the planning through the implementation to the operation and during the operation of the installation.

The aforementioned listings are to be regarded as selectively combinable and in no way exhaustive.

Installations to be automated, irrespective of whether they are, for example, technical installations relating to methods and/or processes for the production of chemical substances and/or for the generation of electrical energy, in each case go through a specific life cycle, which generally extends over several decades.

At the beginning of each life cycle of a technical installation and/or an installation component there is its design or planning. The design or planning takes place in steps, initially conceptually, then in detail, then it is implemented in all its components, that is to say is constructed, if appropriate programmed and tested, and then finally commissioned. In the further life cycle, during the operating phase of the respective technical installation, it is serviced and, depending on requirements, generally modified, converted and/or modernized several times.

In all the aforementioned life cycle phases of the technical installation, comparatively large quantities of data, relating to the respective installation, are generated or acquired and/or altered. Aforementioned data may comprise, for example, measurement, monitoring, performance and/or assessment data of the respective installation but also information on maintenance and/or servicing measures and also technical further developments or improvements of the installation. The acquisition of data takes place here in particular during the engineering process or during the planning and design phase, at the beginning of the respective life cycle of an installation. The data generated here essentially describe the structure and the implementation of the respective technical installation. The modification or alteration of the generated or acquired installation-specific set of data and/or the acquisition or generation of new data, relating to planned and/or performed modifications to the respective technical installation, takes place here largely in the operating phase of the respective installation.

It is customary to prepare and store the data of a technical installation or data relating to a technical installation by means of various processing tools and databanks. This is also attributable, inter alia, to the fact that different groups of persons and technical disciplines are competent or responsible for the various tasks and/or questions to be dealt with during a life cycle of an installation or installation component. In turn, these groups must generally operate tools or processing tools which are set up specifically for the respective task or the respective application area and are in particular of a programming nature and are also generally developed by different companies or manufacturers.

These include, for example:
engineering tools which are used for the engineering of the electrical components of an installation,
engineering tools which are used for the (metal) construction of the installation components,
engineering tools which are used for the instrumentation and control system or the open-loop and closed-loop control system of the respective technical installation and
processing tools which are used for the organization and documentation of the servicing or maintenance work to be carried out on an installation.

Disadvantageously, data on specific objects of a technical installation are in this case at least partly kept or recorded and processed in a number of tools in parallel and also to the greatest extent independently of one another, which can lead to the need for coordination and to inconsistencies with respect to the overall database of an installation.

To avoid or overcome any coordinating differences and/or inconsistencies occurring, relating to the recorded database of a technical installation, it is necessary when using a number of different processing tools for a common databank to be used for all the processing tools or applications relating to the life cycle of an installation. This may be, for example, a central databank or a number of distributed databanks with a common data model or object model.

However, such a procedure disadvantageously has the effect that, depending on the number of processing tools used and the differing data formats accordingly occurring, the data model can become very extensive and the data model additionally also has to be laboriously adapted for every tool subsequently to be added, or in the event of alteration of the data model used, all the tools interacting with the data model must be checked for the need for alterations and adapted.

As an alternative to this, information can be exchanged between every two of the tools used via a specifically defined data interface, for example a corresponding file. However, such a proprietary data interface is disadvantageously always dependent on the processing tools respectively involved or used, so that, with every alteration or modification of one of these tools, the aforementioned data interface also has to be adapted, which presupposes corresponding expertise and in turn leads to increased adaptation effort and work. It is also disadvantageous here that, for n tools, where n is the number of tools used, $n*(n-1)/2$ data interfaces have to be set up, serviced and maintained if every tool involved or used is to have the possibility of exchanging data or interacting with every other tool and a specific interface format has to be defined or established for each exchange.

To reduce the number of data interfaces, usually a data format is selected or defined and standardized, for example as a company standard, as a national standard and/or as an international standard, and, resulting from this, a central standard data format is generated, allowing the reciprocal data exchange of the processing tools or applications used. This has the advantage that, for n tools (n=number of tools) using the central standard data format now only n interfaces are required, which considerably reduces the effort involved in creating interfaces and servicing interfaces. Each of these interfaces converts project and/or projecting data or other data relating to the installation, its components and/or its automation system from the tool-internal, proprietary format into the standardized data format and makes them available to all the other tools by means of export functions. Furthermore, each of these interfaces converts project and/or projecting data or other data relating to the installation, its components and/or its automation system from the standardized format into the tool-internal, proprietary format and makes them available to the respective tool by way of an import possibility. This allows, for example, various processing tools to read in the data or information relevant to them from a file, analyze, display, process, alter and/or supplement them and write them back to the file.

Examples of standard data formats are
  initialization files, to and from which information can be written and/or read by various tools or applications and the operating system,
  registry files, to and from which information can be written and/or read by various tools and the operating system,
  comma-separated ASCII files, which have become a virtual standard for simple data access and a widespread data exchange format for table structures.

Examples of standard data formats from the area of automation technology are
  STEP (Standard for the Exchange of Product Data), in particular the STEP exchange language EXPRESS,
  the standard IEC 61131-3, which likewise defines an exchange format for programs with which the open-loop and closed-loop control functions of an automation system are described, in particular the annex to this standard and
  the standard OPC (Open Process Control), which defines an exchange format between the controllers and the display devices of an automation system.

Accordingly, a company-internal standardized description of the data of an automation project and the installation to be automated are described in EP 0770943 B1. A description of a company-internal standardized part of the engineering data of an automation project is also given in A. Fay: Methoden zur Unterstützung der Migration von Prozessleitsystem-Software [Methods for supporting the migration of process control system software], Automatisierungstechnische Praxis 44, Oldenbourg-Verlag, Munich, issue June 2002, pp. 39-44, reference being made in particular to the advantages such as reduction of the complexity of an interface with respect to a number of engineering tools.

File formats or exchange formats which have proven to be particularly successful for use as a standard data format are those in which information
  is stored in a human-readable format, for example composed of ASCII characters,
  is stored in a specific defined structure, for example a hierarchical structure and/or a tree structure and
  information is stored together with descriptors describing the information.

When corresponding data or file formats are used, the respective data or files can be easily read by humans with comparatively little effort and information can be found and interpreted correspondingly easily. In addition, individual applications or processing tools with which the aforementioned files can be processed, that is to say read and written, can be created in a comparatively simple way.

The Extensible Markup Language (XML) is a sufficiently known meta language for the definition and description of languages, data formats and/or structures, in particular also for the definition and description of a data exchange format. XML schemes can establish rules as to how an XML document is to be composed in its logical structure, for example concerning elements and hierarchy. With the aid of XML schemes, it is possible for example to check whether an XML file is composed in conformity with such rules established in the XML scheme (known as "wellformedness"). This makes it possible with comparatively little effort to create individual processing tools or applications which can read XML files, check them for wellformedness, convert them into another, if appropriate proprietary, data format or object model and/or transform an existing object model or the data or information describing it into a well-formed XML file.

XML files usually have all the aforementioned features which a standard data format should have. In addition, the language XSLT (XML Stylesheet Language Translation) is known; XSLT was defined in connection with XML as a programming language for transforming XML documents into other standardized formats.

On account of its known advantages and possibilities, XML is used or recommended for use in very many areas in which there is the necessity to exchange data between various processing tools in a standardized format. The possibility of advantageous use of XML for such tasks in any desired application areas is generally known and was also the declared objective of the development of XML.

Therefore, the application or use of XML for the area of the automation of technical installations, and in particular for the data exchange between various engineering tools, is also well known and customary.

In DE 101 38 533 A1, XML is named and used as a meta language for the definition of an exchange format for project and/or projecting data of an automation project, in that, for each processing tool which internally uses a proprietary data format and interacts with the standardized data model, a specific conversion module which carries out the conversion from the proprietary data format into the standardized data format, or vice versa, is created. The aforementioned conversion module can be implemented here either as an independent tool which is linked to the respectively associated processing tool, for example an engineering tool, or can be integrated into the respective processing tool, for example an engineering, service or validation tool, if appropriate combined with an import and/or export functionality.

When performing the data exchange of project information by means of a standardized data format, however, there is a fundamental problem in that, even when XML is used, it is necessary for the definition of data exchange formats not only to establish a uniform syntax and structure of the standardized data format, which in the case of XML can then be described for example by an XML scheme, but also to determine uniform semantics. This means that the individual data modules have to be understood or interpreted in the same way by the persons involved or by the processing tools created and/or used by the aforementioned persons. For example, the attribute "Setpoint", which is hierarchically assigned in the data format to the object "Controller TI 206", can be allocated the value "0.8" by a first projecting tool. On the other hand, another, second processing tool, originating for example from a different manufacturer or a different developer, can only correctly interpret and implement this value if it knows that setpoint values of controllers are designated in the first projecting tool as "Setpoint".

As disclosed for example by DE 101 38 533 A1, this problem of the necessity for agreement on common semantics can be organizationally handled with comparatively acceptable effort within the engineering tools of a single manufacturer. Irrespective of the use of XML or another descriptive language, however, a significantly greater effort is required if it is intended to establish a standardized data format which is also to support processing tools or applications of different manufacturers and/or developers and to offer the possibility, for example to extend the functionality of the overall concept, of also subsequently integrating or applying further processing tools with new functionalities, with the further processing tools in particular generating, reading, processing and/or altering further data and/or data formats.

In a known way, the programming language XSLT can also be used to transform XML files into files with other standardized or proprietary formats, it being disadvantageous when there are alterations to the proprietary data format that interventions are required in the programming code of the conversion modules specified or used.

The aforementioned alterations of the proprietary data format may be required for example by changes of the functionality of the respective processing tool, by a change of the implementation of the respective processing tool in the overall concept and/or in the event of alterations of the standardized data format. The aforementioned alterations may be brought about for example by the integration of a further processing tool to the standardized data format. The aforementioned problem is gaining increasingly in significance as result of the ever shorter innovation cycles, the accompanying shorter cycle times and frequent changes of the generations or versions of tools that are used and also as a result of the increasing requirements with regard to the integration of further tools or applications.

Interventions in existing applications and/or processing tools entail problems in particular from the aspect that—as already stated—the information or data describing a technical installation and its automation system is intended to be or has to be kept consistent and maintained over the entire life cycle of the installation, which can usually extend over several decades, since this would necessitate interventions and modifications of decades-old applications and processing tools, in particular of their programming codes. However, there is generally no longer any expertise existent or available for this.

To be able to ensure the required flexibility, even over decades, the use of configurable conversion tools, in particular for use in the conversion or the exchange of project or projecting data of an automation project, is recommendable for example, as known from EP 01150193 A1. Use is made there of a conversion tool which is independent of detailed information of the respective application domain or the respectively relevant application area, such as for example the process technology, the development of the instrumentation and control technology, the operation or the service area. The data conversion takes place here in a comparatively laborious and complex manner by means of graphic rules, under which the creator and/or user is to graphically configure the condition part and the action part of a conversion rule.

The invention is based on the object of providing a method and a system of the type stated at the beginning which are intended to make possible and ensure the most simple and efficient possible management of data and the most simple and efficient possible exchange of data even when different processing tools are used.

This object is achieved by a system and a method for managing and exchanging, in particular also generating, modifying and storing, data of a technical project, a technical installation and/or individual installation components, in particular however of an automation project for a technical installation, with the features of the independent claims. Advantageous refinements of the system according to the invention and of the corresponding method are specified in the dependent claims and the description which follows.

The present invention comprises a data-processing system with a conversion device for converting data from a proprietary data format into a standardized data format, and vice versa, the conversion of detailed information being independent of the respective application domain. By contrast with the method described in EP 01150193 A1, the conversion information of the various application domains is not stored here as graphic rules but is specified in the form of assignments between data objects, it being possible for the assignments to be of the type 1:1, 1:n, m:1 or m:n, where m and n are any desired natural whole numbers greater than 1.

The system according to the invention for managing and exchanging data, in particular also for generating, modifying and storing data of a technical project, a technical installation and/or individual installation components, in particular of an automation project for a technical installation, has at least one data-processing system with a conversion device for converting project and/or projecting data and/or operating data of the respective technical installation and/or of the associated automation system from a proprietary format into a standardized format, and vice versa. The conversion device here comprises at least one means for data assignment, which is set up for assigning at least one, first piece of information, given in the proprietary format, to at least one, second piece of information, given in the standardized data format, preferably XML, and/or vice versa. In addition, the conversion device has at least one means for data conversion, which is set up for locating or finding for any desired first piece of information, given in the proprietary data format, the corresponding data assignment assigned to it from among the data assignments that are present and, by means of the data assignment found, for transforming the proprietary, first piece of information into the standardized, second piece of information specified in the assigned data assignment, and/or conversely for locating or finding for any desired standardized, second piece of information the corresponding data assignment in the data assignments contained in the conversion device and using it to transform the standardized, second piece of information into the proprietary, first piece of information specified in the assigned data assignment. An advantageous refinement provides that the conversion device is set up for performing a series of the aforementioned procedures to search for and locate for a first piece of information, given in the proprietary data format, the corresponding data assignment assigned to it from among the data assignments that are present and, by means of the data assignment found, to transform the proprietary, first piece of information into the standardized, second piece of information, specified in the data assignment, and to search for and locate for the standardized, second piece of information the corresponding data assignment assigned to it in the data assignments contained in the conversion device and to use it to transform the standardized, second piece of information into a proprietary, third piece of information, specified in the data assignment.

Here, the data both in the proprietary format and in the standardized format are preferably stored in a predetermined, defined structure, in particular a hierarchical structure and/or a tree strucure.

Both the proprietary format and the standardized format are preferably human-readable and human-interpretable and/or contain descriptive descriptors for the respective data here.

The specified conversion device is configurable, to the extent that it can be separated into two independent components, namely a component a) for the assignment of data and a generic component b) for the conversion of data, the generic component b) providing the conversion function and usually being realizable as a program component which can be executed on a data-processing system in a customary programming language and with corresponding program coding means. The data assignments specified in the component a), in particular a file, which serve the purpose of matching the conversion device to the respective application domain or the respective application area and/or the respectively used processing tool and the data formats to be converted into one another, are individually adaptable and configurable here.

In an advantageous implementation, the data assignments are stored in the form of a simple table. If a simple assignment by means of a table is not possible, the conversion may also take place by means of a hierarchically organized mapping structure, which is used for example in the case of parsers for textual programming languages, as described in the German Patent Applications with the official application numbers DE 102 54 530.8, DE 102 54 531.6 and DE 102 54 532.4.

As provided by the system, the aforementioned separability or configurability gives the conversion device the advantage that component a) of the conversion device, which has at least one means for data assignment, and component b) of the conversion device, which has at least one means for data conversion, can be developed, further developed and maintained independently of one another. Therefore, the generic component b) can be adapted at any time for example to currently available or commonly used program coding means, operating system environments, development methods and/or techniques, which will become necessary with probability bordering on certainty several times during the life cycle of a technical installation if specific project and/or installation data are used over several decades. The data assignments of the application domain specified in the component a) remain unaffected by this, however. Similarly, the data assignments can be easily altered, for example in the advantageous tabular implementation by altering an entry or a number of entries in the table, without thereby having to change the actual programming code. The aforementioned alterations can be carried out manually and/or in an automated manner here. This can be carried out in an automated manner here for example by means of a processing tool which supports manual graphic mapping or which determines mapping relations in an automated manner by rule-based parsing of the proprietary data structures and enters them in a corresponding mapping table.

This is advantageous in particular if the standardized data format must be changed and/or extended, because for example a further processing tool which has, reads in, changes and/or creates additional data and objects is to be integrated in the group of processing tools by means of the standardized data format, preferably XML. According to the prior art, this would require that, for all the processing tools which are intended to or wish to use these additional data and objects likewise in a reading and/or writing mode, the corresponding conversion components should be adapted or extended by interventions in the possibly decades-old programming codes, which generally presupposes expertise and costly program coding means, for example suitable compilers and/or debuggers. With the aid of the system according to the invention and the method according to the invention, on the other hand, this extension can be accomplished just by simply supplementing and/or altering the data assignments that are specified, for example in tabular form, in a standard data format file. This does not require any expertise or programming knowledge or costly program coding means.

A method for managing and exchanging data relating to a technical project, a technical installation and/or individual installation components, in particular relating to an automation project, by means of at least one data-processing system with a conversion device for converting data from a proprietary data format into a standardized data format, and vice versa, is also claimed. Here, the conversion device, using at least one means for data assignment and at least one data assignment, allows at least one, first piece of information, given in the proprietary data format, to be assigned at least one second piece of information, given in the standardized format, and/or vice versa. As provided by the method, a generic component of the conversion device with at least one means for the conversion of data is used to locate or find for any desired first piece of information, given in the proprietary data format, the corresponding data assignment assigned to the first piece of information from among the data assignments that are present and, by means of the data assignment found, to transform the proprietary, first piece of information into the standardized, second piece of information, specified in the assigned data assignment, and/or conversely to search for and locate for any desired standardized, second piece of information the corresponding data assignment assigned to the second piece of information in the data assignments contained in the conversion device and to use it to transform the standardized, second piece of information into the proprietary, first piece of information, specified in the data assignment. By performing a series of the two procedures, a first, proprietary piece of information can accordingly be transformed by means of data assignments into another proprietary piece of information.

The generic component used preferably acts here independently of the standardized data format and the proprietary data format.

The data can be stored both in the proprietary data format and in the standardized data format, preferably using a predetermined, defined structure, in particular a hierarchical structure and/or tree structure.

Both the proprietary format and the standardized format, in particular XML, are preferably human-readable and interpretable and/or formed with descriptive descriptors for the data here.

The further description of the invention is based on several exemplary embodiments. Advantageous refinements and developments of the invention are specified in the descriptions of the figures which follow and in the dependent claims.

Figure 1:
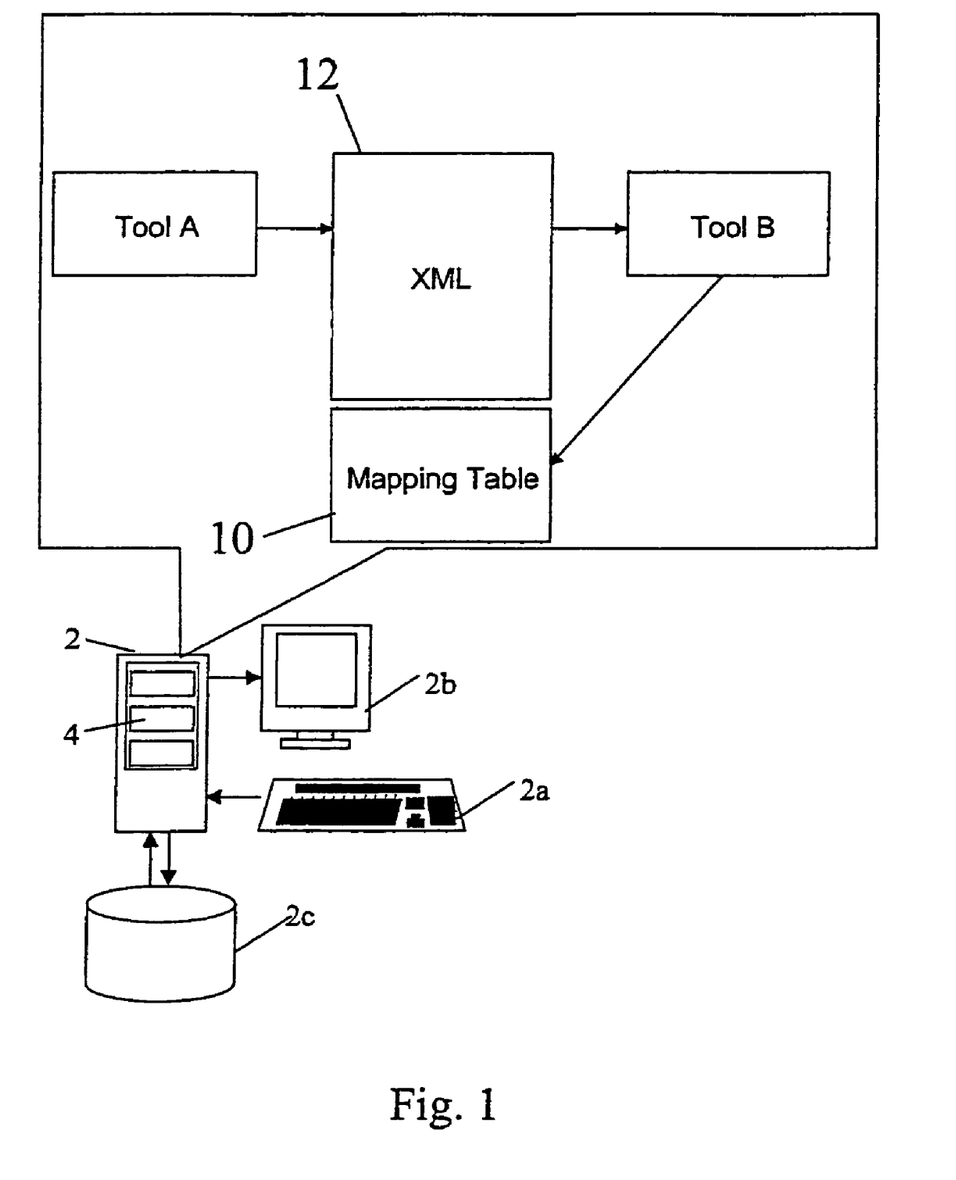
FIG. 1 shows a system, given by way of example, for managing and exchanging data between two different processing tools by means of a mapping table.

In FIG. 1 there is shown an embodiment, given by way of example, of the system according to the invention for managing and exchanging data of a technical project, a technical installation and/or individual installation components, but in particular of an automation project for a technical installation. The aforementioned system has here a data-processing system 2 with a conversion device 4 and means for the data assignment and conversion of data from at least one proprietary format into at least one standardized format, and vice versa. A transformation between any two data formats can be mapped here by means of semantic mapping tables 10. The data-processing system 2 also has here an input device 2a, a display device 2b and a data memory 2c, with which it interacts.

The mapping tables 10 do not necessarily have to be of a flat structure here, but may also have a hierarchical structure. The mapping tables 10 comprise assignments between data and/or objects of the data formats of a first tool, tool A, and a second tool, tool B, and are to be understood as semantic links or references. If, for example, an object "circle" is read in by a drawing tool, tool A, this object may receive an assignment to the object "DynamicCircle" supported by tool B. If, as shown in FIG. 1, the file exchange format is standardized, for example as in the case of an XML file 12, the syntactically correct reading-in of the data present in the standardized format is significantly facilitated. One advantage of the mapping tables 10 is that the respective application, in the example shown here tool A or tool B, can not only read in the XML file 12 syntactically correctly but can at the same time obtain or extract the required semantic information from the respective mapping table 10. This means that the tool B "understands" the XML file 12 through the "spectacles" of the mapping table 10, that is to say can correctly interpret it and consequently work directly with the XML file 12. It follows from this that alterations can in turn be written back to the XML file 12, whereby tool A can gain knowledge of alterations of the file that have been brought about by tool B.

The creation and/or alteration of the mapping tables 10 may take place manually before or during the method, depending on the application area, by the user of the various applications or else the corresponding mapping tables 10 may be supplied along with the applications or processing tools that are respectively used. In special cases, the creation of the mapping table 10 may also take place automatically.

A precondition for the application of mapping tables 10 is the presence of a one-to-one assignment between at least some of the data or information present, the term data or information including the associated objects, their attributes and their relations.

The use of mapping tables 10 according to the method is described below by way of example on the basis of several exemplary embodiments.

Figure 2:
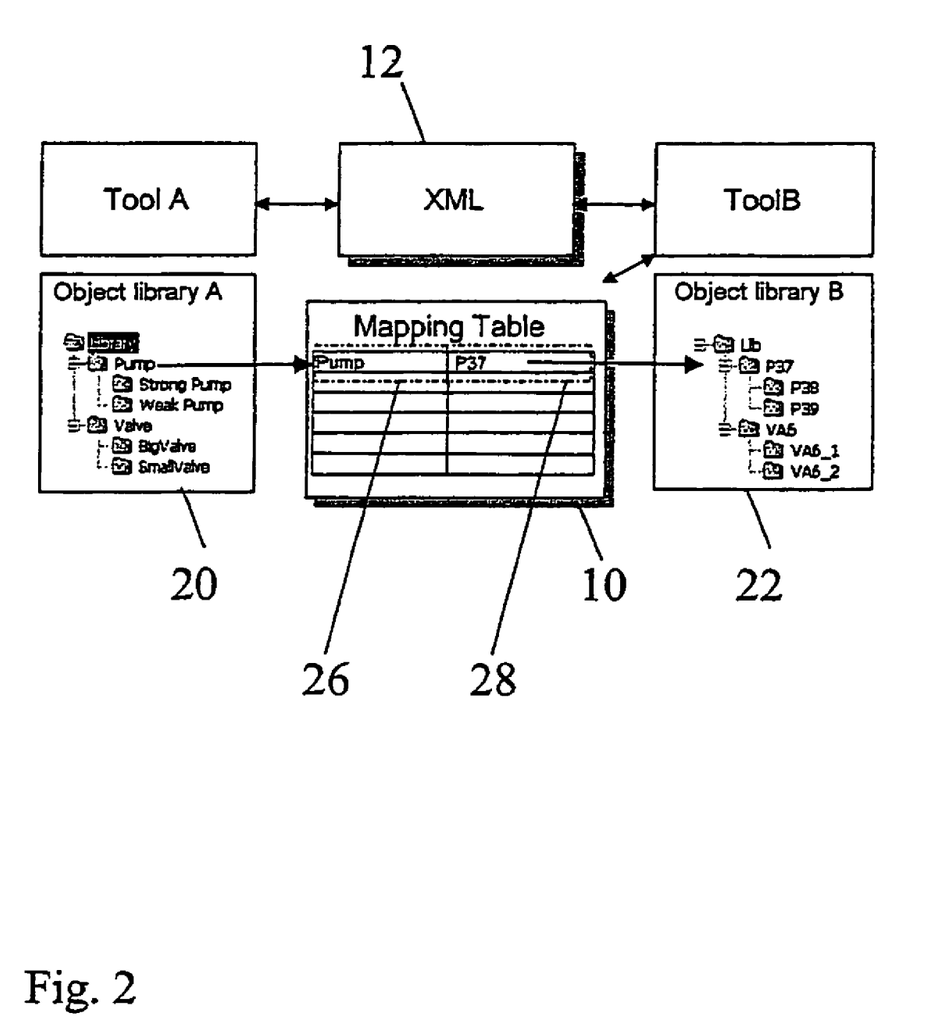
FIG. 2 shows a method diagram, given by way of example, concerning the management and exchange of objects between object libraries of two different processing tools by means of a mapping table.

In FIG. 2 there is shown a starting situation, in which a tool or an application, tool A, for the creation of project data uses a tool's own specific "object library A" (data library) 20. The objects (data or information) contained in the "object library A" 20 are instantiated or copied and provided with actual values in the project processing. A similar procedure is followed in a further tool, tool B, it being possible for the "object library B" 22 to have a structure that is different from the "object library A" 20. If they have been implemented by programming, the two aforementioned, different processing tools may be executed here on the data-processing system 2 (cf. FIG. 1) with conversion device 4 (cf. FIG. 1) or else on other data-processing devices if they interact with the data-processing system 2 with conversion device 4 via corresponding network connections, such as for example LAN, WAN or in particular Internet connections and/or radio links.

A data transfer from a first processing tool, tool A, to a second processing tool, tool B, is brought about by relations between the elements of the libraries "object library A" 20 and "object library B" 22, of the two tools, concerning for example objects, attributes and/or information, being created and stored in a separate relations table or mapping table 10. If, as shown in FIG. 2, an XML file 12 is then read in by the second processing tool, tool B, and an object "pump" 26 is found from the "object library A" 20, tool B can assign this object "pump" 26 with the aid of the specified mapping table 10 to its own object "P37" 28.

If a unique assignment of all the data used both in the first tool, tool A, and in the second tool, tool B, that is to say the set-theoretical intersection of both object libraries 20, 22, including empty relations, is possible, a complete mapping table 10 can be formed. With the aid of the aforementioned mapping table 10, the exchange of any desired files and/or data or information is then possible between the two tools, tool A and tool B.

Figure 3:
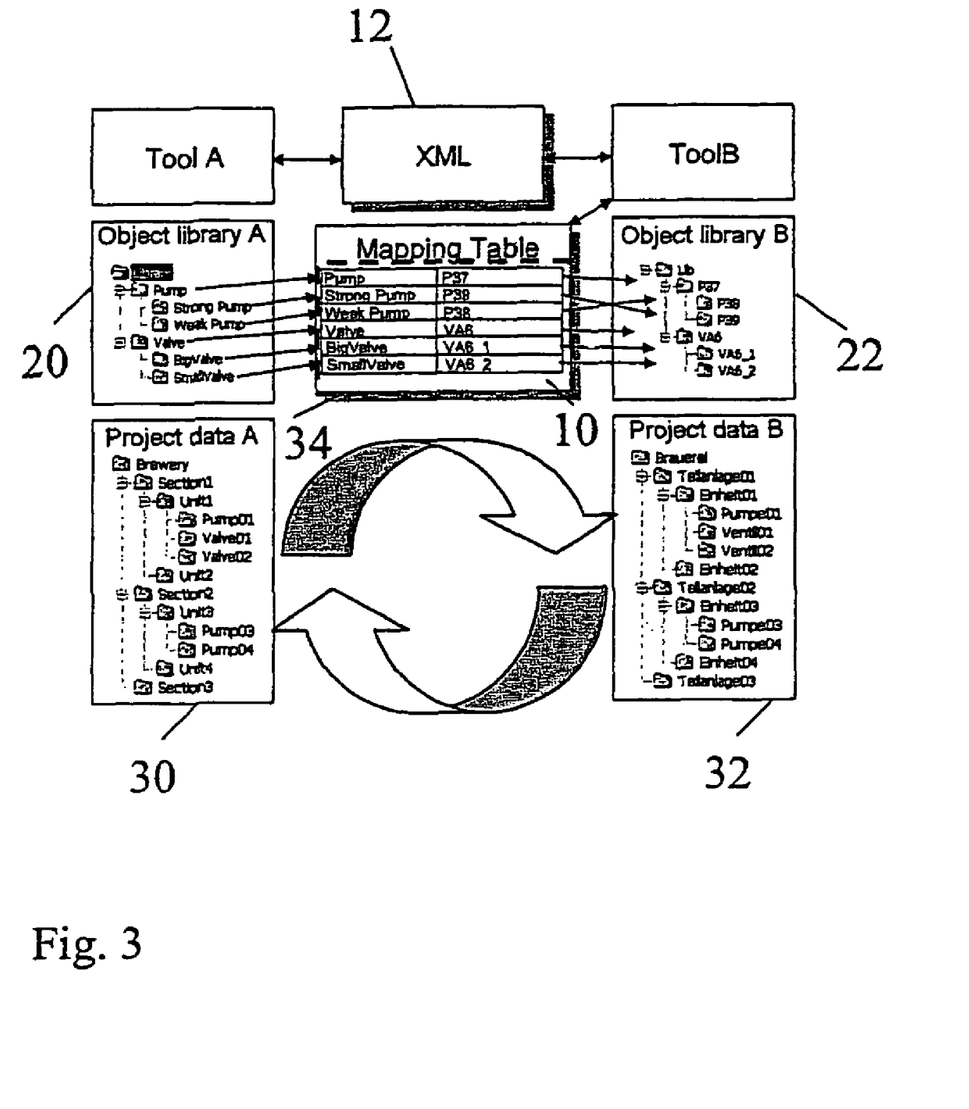
FIG. 3 shows a method diagram, given by way of example, concerning the management and exchange of objects and their contents between object libraries of two different processing tools in the case of a complete mapping table.

If, as FIG. 3 shows, a second tool, tool B, then reads in the XML file 12, containing for example relevant installation and/or project information, it can assign to every first piece of information of the "object library A" 20 that is converted into the XML file 12 and found a second piece of information of its own "object library B" 22. The aforementioned information may be, for example, measurement or control data, assessment results, in particular of another tool, performance data, or maintenance data. A file with "project data A" 30 consequently becomes directly readable for the tool B in the form of a further file with "project data B" 32. Since the assignment 32 between the data is one-to-one, tool B can write alterations from the "project data B" 32 directly back to the XML file 12 and consequently make them available to the tool A.

If, on the other hand, the mapping table 10 is merely created with assignments between data used of an actual set of project data, generally only an incomplete mapping table 10 is created. In this case, the data exchange can specifically take place only for the file of this project or the data exchange can only take place between projects of which the data are completely described by the mapping table 10.

Figure 4:
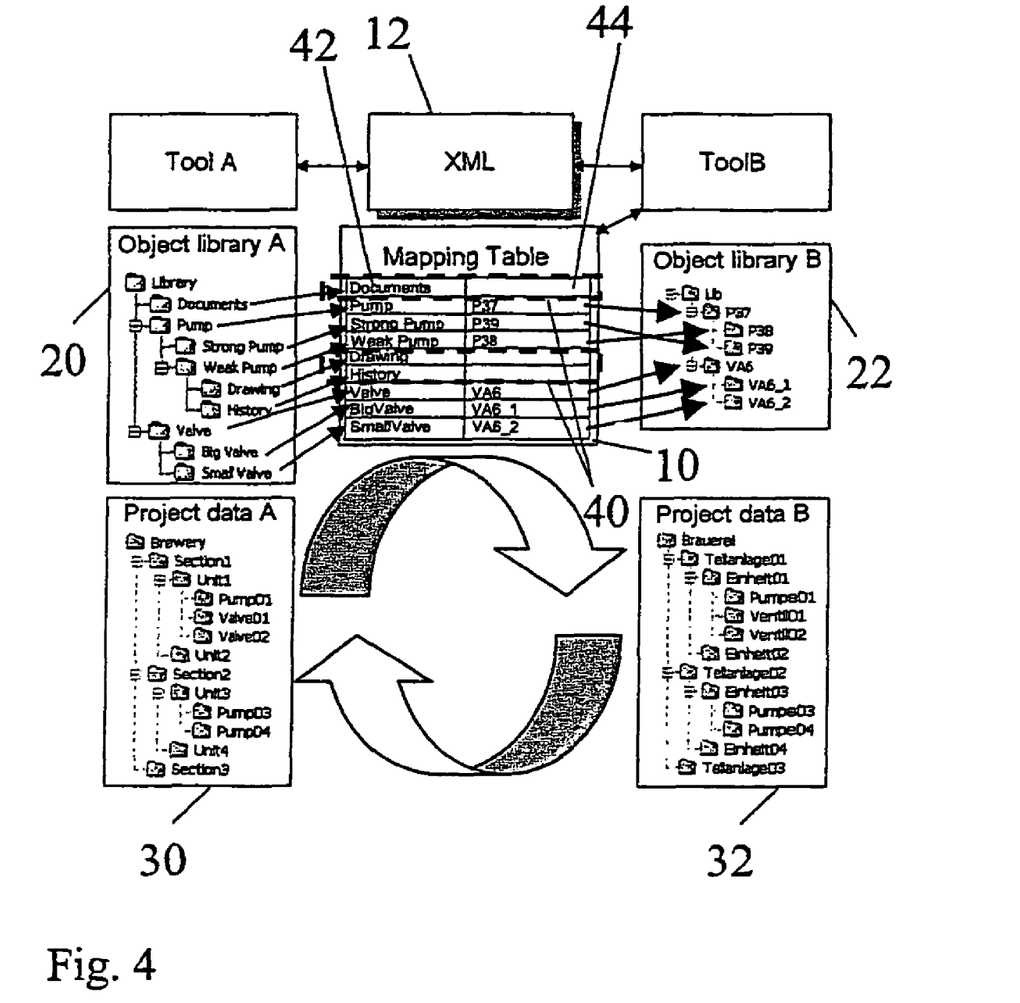
FIG. 4 shows a method diagram given by way of example, concerning the management and exchange of objects and their contents between object libraries of two different processing tools in the case of an incomplete mapping table.

One advantage of the invention is that it is harmless if a second tool, tool B, cannot process all the data made available by a first tool, tool A. In this case, as shown in FIG. 4, an empty relation 40 is obtained between these data. According to FIG. 4, the first piece of information "Documents" 42 from the "object library A" 20 does not receive any relation in the mapping table 10 with respect to a second piece of information 44 from tool B. Consequently, tool B only receives knowledge of the data that are known by way of a relation. Since, however, both tools work with the same XML file 12, advantageously no data are lost here, a data loss is avoided. As a result, tool B processes only some of the data of the XML file 12, with the rest of the XML file 12 or its data remaining unaffected. The empty relations 40 here only make up the completeness of the relations and are negligible for the further considerations. In some cases, it may even be advantageous when reading in information from the "project data A" 30 or the "object library A" 20 to supplement the "object library B"

22 automatically and consequently reduce the number of empty relations 40. In this way, tool B can "learn" from tool A.

To sum up, it is possible with the aforementioned method for both tools to work with the same XML file 12. Import filtering functions known from the prior art no longer have to be a component part of the application read in or the tool read in but are completely mapped by a separate information assignment in the form of mapping tables 10, which can be exchanged, extended and maintained without programming knowledge and/or expertise with respect to the applications or tools that are respectively used being a precondition or requirement.

In addition, the concept of the mapping tables 10 can be advantageously used for supporting the iterative engineering for a number of or all the phases of the engineering, in order to ensure in this way a continuous information flow. By tracing relations back over a number of mapping tables 10, corresponding to a kind of assignment path, any desired information can be traced back and retrieved at any time. As a difference from known methods, the engineering process is accordingly advantageously not set up on a tool basis but on a data basis. This means that the engineering phases are processed by separate tools, which however are enabled by a standardized data interface to read in, display and process the resulting documents of other engineering phases and extend their own results and/or information. The iterative engineering can be advantageously supported and its efficiency increased by the fact that the original tool can read in again and further process this extended information, without a new assignment being required, since a corresponding new assignment is already covered by means of the mapping table 10.

It is not necessary, in the way customary with databanks of the same generic type, for the XML file 12 to have a structure that is established, predetermined and well-defined at the beginning, satisfying all the current and future demands of the tools used in the sense of a well-defined meta model or a meta databank. The mechanisms of the XML file format allow an extension of the data format at any point in time in the life cycle of an installation without influencing and/or altering the readability of the XML file 12 for the other tools.

The advantage over known methods is that, although the tools can only process their own problem space, they are freed of the syntactic restrictions of a proprietary data format or file format by a generic data format such as XML for example.

By using mapping tables 10 there is an interlinkage or assignment of those data which lie in the limited problem space of each of the tools to those data which are already contained in the XML file 12. Consequently, every tool or else every application sees the XML file 12 through its own "spectacles" or a "filter" of its own and consequently receives its own view of the data (view model). Results of the tools are stored step by step in the XML file 12 and can be further processed by further mapping tables 10 in subsequent tools or applications. In this way, the XML-based installation project file grows and, with the aid of different mapping tables 10, presents itself to each tool individually, that is to say in its own way.

The mapping tables 10 act in this case as a kind of information filter which masks the, for example, XML project file. The overall XML file produced or the set of XML files 12 produced thereby always forms a consistent data object for all the information occurring.

Advantageously, the tools do not have to be repeatedly adapted over time to the altering data, but instead the interpretation of the data takes place in an automated manner by mapping tables 10. Mapping tables 10 are in this case available outside the tools as a variable means of configuration which can be created with comparatively little effort and limited special knowledge or expertise.

Since all the information is compiled in a single XML file 12 or a collection of XML files, the keeping of the data is, in principle, consistent. To sum up, it is possible according to the method for all the tools or applications used to work with the same XML file 12 or with the same set of XML files. Known import filtering functions are no longer a component part of the application read in or of the tool read in, but are completely mapped by at least one separate mapping table 10, which can be exchanged, extended, read by a suitable generic data format such as XML and consequently also maintained.

Figure 5:
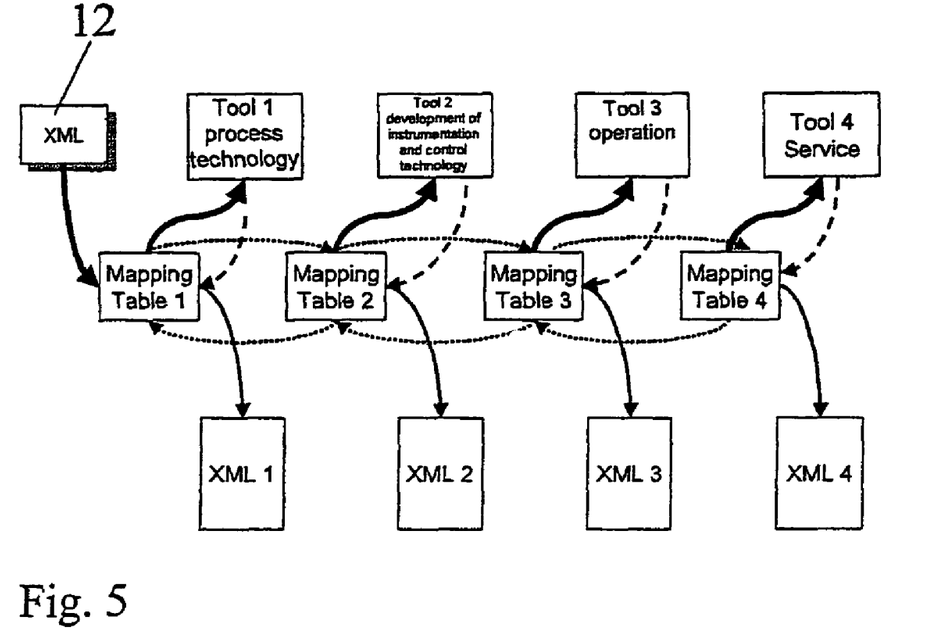
FIG. 5 shows a method diagram, given by way of example, concerning the management and exchange of information between a number of different processing tools and a respectively assigned mapping table.

The aforementioned aspect of the invention is presented in FIG. 5 by way of example on the basis of a selection of tools involved in the engineering, tool 1 to tool 4.

At the beginning of the engineering process, there is in simplified terms initially an empty XML file 12. A process engineer determines from his specifications a P-I diagram (diagram of pipelines and installations) and creates this in tool 1 using an object library. Each of the elements of the diagram, in particular tanks, pumps, valves, pipelines, etc., are objects of the drawing and have individual properties with their associated values, such as for example volume, diameter, etc. This information is stored in the XML file 12 by means of a predetermined assignment or mapping table, mapping table 1.

An instrumentation and control development engineer requires a series of pieces of information from the P-I diagrams, such as for example relating to measuring points, control loops, sensors and actuators. The assignment between the objects of the P-I diagram and the objects of interest to the instrumentation and control engineer, for example sensors, actuators, control loops, etc., is realized by means of mapping table 2. A second tool, tool 2, is consequently supplied with a limited segment of the information of interest to it from the XML file 12. From this, the instrumentation and control engineer develops for example the control software, chooses suitable equipment from an equipment library, configures the communication systems and/or develops operator graphics. The data produced are in turn written back to the XML file 12.

A third tool, tool 3, may be the operator control software, which is shown to an operator or user during operation. This enables the operator to operate his installation, establish irregularities, start and end processes or introduce various measures for servicing or avoiding breakdown. From this software, the operator can access all information created in the development cycle of the installation. The selection of which information this is is made by the mapping table 3. Mapping tables consequently allow the retrievable information to be restricted.

A fourth tool, tool 4, may be a service tool, which is available to a servicing engineer of an installation. This enables him to retrieve the information relevant to him on equipment and functions of his installation. The selection of the information available to him may be established by means of mapping table 4.

A further advantage of the invention is that it is possible with the aid of the mechanism of the mapping tables to extract separate XML files 12, in the example shown here XML 1, XML 2, XML 3 and XML 4, or generally an extract of data from the installation XML file 50 only containing the respectively relevant information in extract form. In this case it is possible, for example, to use the same mapping tables, in the example shown here mapping table 1, mapping table 2, mapping table 3 and mapping table 4, that are used by the respective tools, in the example shown here tool 1, tool 2, tool 3 and tool 4.

Figure 6:
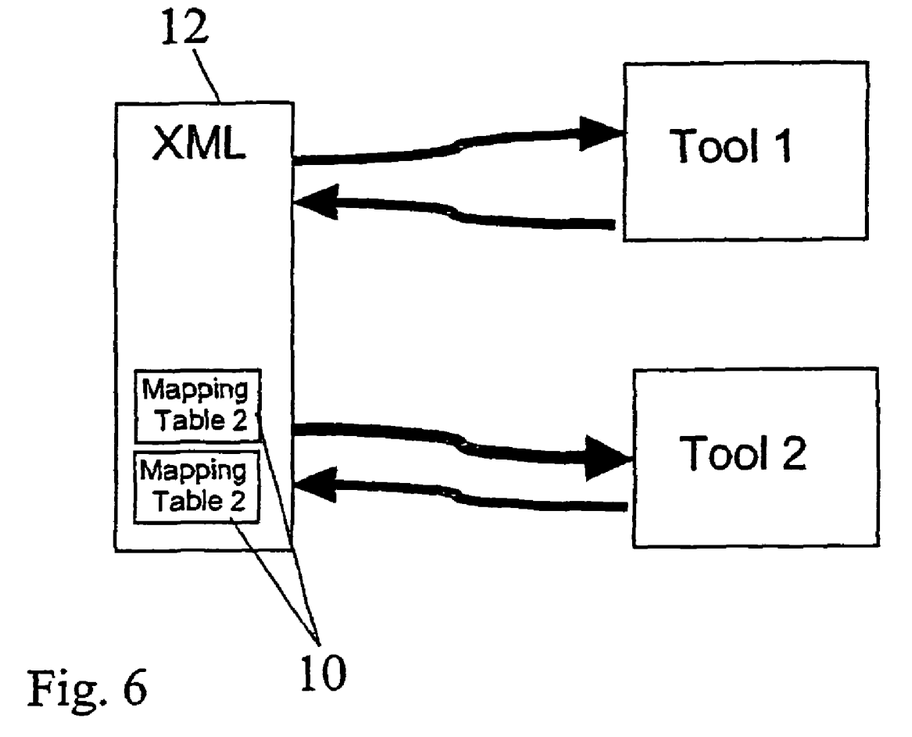
FIG. 6 shows mapping tables as a component part of an XML file.

An advantageous embodiment of the invention shown in FIG. 6 envisages including the mapping tables 10 as a component part of the XML file 12.

An advantage of this refinement of the invention is that the number of files is reduced, which simplifies onward transmission. A further advantage of this aspect of the invention is that, with the mapping tables 10, also included in the XML file 12 is the indication as to which tool for example accesses which information of the XML file 12. This can be used for example whenever the name of a piece of information in the XML file 12 changes—the corresponding tools which use this information can quickly be located and their data assignments can be easily altered automatically. The tools themselves do not have to be altered for this. If, on the other hand, the name of an object in a proprietary databank of a specific tool changes, only the set of mapping tables 10 assigned to this tool has to be found and the assignments to the object concerned altered.

A further advantageous refinement of the invention is to add additional information, serving for coordination and meaningful dissemination of the data, to the individual entries of the mapping tables 10. If, for example, a tool alters the value of an attribute in the XML file 12, the conversion device 4 (cf. FIG. 1) will immediately search through all the mapping tables 10 for references to this very attribute in the XML file 12 and provide them with a marking which indicates that this attribute has changed. Consequently, when they access the XML file 12, the other tools immediately obtain the information as to which data have changed since their last access outside the program.

The aforementioned marking may take place for example by flags (electronic markers) which indicate this alteration. Once the corresponding tool or the respective application has read in the altered data, it can leave behind a corresponding sign in the XML file 12, for example by resetting the aforementioned marking, by which it signals that its data are at the current state. This kind of set-up allows the current overall state of the installation to be determined comparatively easily. Conversely, it is also evident from the file which tools and parts of the installation have not yet been brought up to the current state of the XML file 12 or the respective project, since a unique assignment is possible by means of the mapping tables 10.

In addition, it is advantageously possible to introduce a reference to the source of the alteration and/or further information relating to the alteration, such as in particular the date of the alteration. Therefore, for example, all the data and information generated in the entire life cycle of the installation, including all their alterations and versions and including all the alterations in the mapping tables 10, can be provided in each case with a time stamp or a marking and/or some other reference. The XML file 12 then no longer represents only the current state but also the entire history, that is to say the progression over time or the development over time of the respective project over its entire life cycle or else only over part of its life cycle. The XML file 12 here forms a kind of logbook of the installation.

A further advantageous embodiment of the invention makes it possible for the information of the mapping tables 10 to be stored separately in a specific format, preferably an easily readable format such as for example XML. This may take place in particular in individual files, a group of files, a databank or a collection of files. The file exchange may advantageously take place in a file-based manner or by data flows, for example by way of a network with the aid of a data exchange protocol directly between various applications.

The invention claimed is:

1. A data processing system for managing and exchanging data relating to a technical project, a technical installation or individual installation components, over a network data-processing system, the system comprising:
a first processing device executing a first tool that generates data in a first data format, wherein the data of the first processing device is mapped to a first mapping table;
a second processing device executing a second tool that generates data in a second data format, wherein the data of the second processing device is mapped to a second mapping table;
a conversion device that receives the data in the first format from the first processing device, generates data in a standardized data format based on the data in the first data format received from the first processing device, transforms the data in the standardized data format into data associated with the second data format of the second processing device, and stores the data generated in the standardized data format as a data file,
wherein when a value of an attribute stored in the data file changes, the conversion device marks each mapping table having a reference to the attribute, and
wherein at least one of the first and second processing devices associated with a marked mapping table, marks the data file of the conversion device to indicate that the changed attribute has been installed in the associated marked mapping table of the at least one first and second processing devices.

2. The system as claimed in claim 1, wherein the conversion device has a generic component which is independent of the standardized format, the first data format and the second data format.

3. The system as claimed in claim 1, wherein the data in the first data format and in the standardized data format are stored or acquired in a predetermined, defined structure, in particular a hierarchical structure and/or a tree structure.

4. The system as claimed in claim 1, wherein the first and second data formats and/or the standardized format are essentially human-readable and human-interpretable and/or have descriptive descriptors for the data or information.

5. The system as claimed in claim 1, wherein the conversion device is set up such that, in the event of an alteration of a value of an attribute of the data file, the conversion device searches through all the mapping tables for references to the altered attribute and provides the corresponding mapping tables with a marking which indicates that this attribute has changed, so that, when the altered data file is accessed through the mapping tables, other tools executing on the second processing device are immediately given information identifying which data in the data file has changed since a previous access to the data file.

6. The system as claimed in claim 1, wherein in transforming the data, the conversion device locates data in the first data format, the corresponding data assignment assigned to it from among stored data assignments and, transforms the data in the first data format into data of the standardized, second data formed based on the corresponding data assignment.

7. The system as claimed in claim 1, wherein data assignments of the first and second processing devices are stored in an alterable manner as or in at least one mapping table.

8. The system as claimed in claim 7, wherein at least one mapping table is a component part of the data file containing the data present in the standardized data format.

9. The system as claimed in claim 7, wherein, with the at least one mapping table, also included in the data file, are indications as to which tool of the first or second processing device accesses which information of the standardized data format file.

10. The system as claimed in claim 7, wherein the information of the at least one mapping table is specified and/or stored separately in the standardized data format, in individual files or a group of files or a databank or a collection of files.

11. The system as claimed in claim 7, wherein additional information, serving in particular for coordination and meaningful dissemination of the respective data, is added to the individual entries of the at least one mapping table.

12. The system as claimed in claim 11, wherein the additional information includes a current state of the file and a history, the history indicating a progression over time or a development over time, of the respective project and/or a respective installation and/or installation components over at least a portion of a life cycle.

13. A method for managing and exchanging data relating to a technical project, a technical installation or individual installation components, over a network that includes plural processing devices executing respective tools and a conversion device the method of the conversion device comprising:
receiving data in a first data format from a first processing device of the plural processing devices;
generating data in a standardized data format based on the data received from the first processing device; and
transforming the data in the standardized data format into data associated with a second data format of a second processing device of the plural processing devices, wherein the data is generated in the standardized data format as a data file,
wherein when a value of an attribute stored in the data file changes, the conversion device marks a corresponding mapping table in each of the first and second processing devices, which reference the attribute, and
wherein when the first or second processing device accesses the data file to update the attribute in the corresponding marked mapping table, the data file of the conversion device is marked to indicate an installation status of the attribute change at the first or second processing device.

14. The method as claimed in claim 13 wherein a generic component which acts independently both of the standardized format and of the proprietary format is used within the conversion device.

15. The method as claimed in claim 13, wherein the data in the first data format and in the standardized format are stored or acquired in a predetermined, defined structure, in particular a hierarchical structure and/or a tree structure.

16. The method as claimed in claim 13, wherein essentially human-readable and human-interpretable data formats and/or data formats containing descriptive descriptors for the data are used as the first and second data formats and/or standardized data format.

17. The method of claim 13, wherein the data file is an XML file.

18. The method as claimed in claim 13, wherein when at least one generic component is used the method comprises:
searching for a corresponding data assignment from among stored data assignments and, transforming the data in the first format data associated with a standardized data format, based on the corresponding data assignment.

19. The method as claimed in claim 18, comprising:
storing the data assignments in an alterable manner using at least one mapping table.

20. The method as claimed in claim 19, comprising:
recording of at least one mapping table as a component part of the data file present in the standardized data format, containing all the relevant data.

21. The method as claimed in claim 19, comprising:
with the at least one mapping table, indicating which tool accesses which information of the standard data format file.

22. The method as claimed in claim 19 comprising:
adding additional information, used in particular for coordination and meaningful dissemination of the respective data, to the individual entries of the at least one mapping table.

23. The method as claimed in claim 19, comprising:
storing the information of the at least one mapping table separately in individual files or a group of files or a databank or a collection of files.

24. The method as claimed in claim 19, wherein, in the event of an alteration of a value of an attribute of the data file, the method comprising:
searching all the mapping tables for references to the altered attribute and marking the corresponding mapping tables to indicate that the altered attribute has changed, so that, when the data file is accessed in through a mapping table, other tools can be immediately given the information identifying which data have changed since a previous access of the data file.

25. The method as claimed in claim 19, wherein a progression over time or development over time, of the respective project and/or the respective installation and/or installation components over at least a portion of the life cycle is indicated in the data file.

26. The system of claim 1, wherein the data file is an XML file.

27. A data processing system comprising:
plural processing devices for executing tools that generate data in a respective data format, each processing device having a corresponding mapping table for storing the generated data; and
a conversion device, which is connected to each of the plural processing devices through a network, for receiving first data in a first data format from a first processing device, generating standardized data in a standardized format from the first data, transforming the standardized data into second data of a second data format, and sending the second data to a second processing device,
wherein the standardized data is stored in a data file of the conversion device such that when a value of an attribute in the data file changes, the conversion device marks each mapping table having a reference to the attribute, and
wherein when updating a corresponding marked mapping table, each processing device marks the data file of the conversion device to indicate an installation status of the changed attribute value with respect to the processing device.

* * * * *